(12) United States Patent
Sakamoto et al.

(10) Patent No.: US 7,565,944 B2
(45) Date of Patent: Jul. 28, 2009

(54) POWER STEERING SYSTEM FOR ALL-TERRAIN VEHICLE

(75) Inventors: Tomokazu Sakamoto, Saitama (JP); Sumitaka Ogawa, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 374 days.

(21) Appl. No.: 11/360,598

(22) Filed: Feb. 24, 2006

(65) Prior Publication Data

US 2006/0185927 A1 Aug. 24, 2006

(30) Foreign Application Priority Data

Feb. 24, 2005 (JP) ............................. 2005-048577

(51) Int. Cl.
*B60D 5/00* (2006.01)
*B62D 1/16* (2006.01)
(52) U.S. Cl. ........................ 180/426; 180/444; 180/429; 180/443
(58) Field of Classification Search ................. 180/444, 180/426, 429, 443
See application file for complete search history.

(56) References Cited

U.S. PATENT DOCUMENTS

| | | | | |
|---|---|---|---|---|
| 5,887,671 A * | 3/1999 | Yuki et al. | ................. | 180/68.1 |
| 6,668,966 B2 * | 12/2003 | Hasegawa et al. | ........... | 180/417 |
| 6,966,399 B2 * | 11/2005 | Tanigaki et al. | ............. | 180/444 |
| 7,182,169 B2 * | 2/2007 | Suzuki | ....................... | 180/426 |
| 7,216,733 B2 * | 5/2007 | Iwami et al. | ............... | 180/68.1 |

FOREIGN PATENT DOCUMENTS

JP 3-1877 U 1/1991

* cited by examiner

*Primary Examiner*—Paul N Dickson
*Assistant Examiner*—Marlon A Arce
(74) *Attorney, Agent, or Firm*—Birch, Stewart, Kolasch & Birch, LLP (57) ABSTRACT

To provide a power steering system for an all-terrain vehicle in which a control unit can be favorably protected from water, mud or the like coming from the ground surface at the time of operating of the vehicle on rough terrain or the like. In a power steering system for a saddle ride type four-wheel vehicle in which a rotary shaft of a power assist motor is disposed at right angles to a steering shaft and is inclined so that its upper portion is located on the rear side, a control unit for controlling the power assist motor is disposed on the upper side relative to a meshed portion between the power assist motor and the steering shaft.

18 Claims, 10 Drawing Sheets

POWER STEERING SYSTEM FOR ALL-TERRAIN VEHICLE

CROSS-REFERENCE TO RELATED APPLICATIONS

The present application claims priority under 35 USC 119 to Japanese Patent Application No. 2005-048577 filed on Feb. 24, 2005 the entire contents of which are hereby incorporated by reference.

FIELD OF THE INVENTION

The present invention relates to a power steering system for an all-terrain vehicle.

DESCRIPTION OF BACKGROUND ART

An all-terrain vehicle having a power steering system that is driven according to a signal from a torque sensor is disclosed in Japanese Utility Model Laid-open No. Hei 3-1877. In Japanese Utility Model Laid-open No. Hei 3-1877, a power assist motor and the torque sensor are provided on a steering shaft, and a control unit for controlling the power assist motor and the torque sensor are provided at an upper surface of a rear portion of a vehicle body.

In the conventional configuration as above, when the wiring for connection between the power assist motor or the torque sensor and the control unit becomes long, the possibility that a noise may be contained in the signal from the torque sensor is raised, so that it is necessary to take into account the influence of the noise on the assisting performance. In investigating the layout of the control unit, it is desirable to adopt a configuration in which the capability to protect the control unit from water, mud or the like coming from the road surface can be enhanced while making the wiring short between the control unit and the power assist motor or the torque sensor. In addition, the control unit is present at a load carrying platform at a rear portion of the vehicle body, so that it is also desired to enhance the utility of space.

SUMMARY AND OBJECTS OF THE INVENTION

In view the foregoing, it is an object of an embodiment of the present invention to provide a power steering system for an all-terrain vehicle by which it is possible to favorably protect a control unit from water, mud or the like coming from the ground surface at the time of operation on rough terrain or the like, while making the wiring short for the control unit, and to enhance the utility of space.

As a means for solving the above-mentioned problems, an embodiment of the present invention provides a power steering system 80 for an all-terrain vehicle 1 that includes an actuator unit 81 having a power assist motor 82 and a torque sensor 91. The actuator unit is disposed on a steering shaft 25 so to be inclined with an upper portion thereof that is located on the rear side. A control unit 93, for controlling the power assist motor, is disposed on the upper side of the actuator unit.

According to this configuration, with the control unit disposed on the upper side of the actuator unit, the control unit can be contained compactly by effectively utilizing the space around the steering shaft, while disposing the control unit in the vicinity of the torque sensor or the assist motor. In addition, the power assist motor which is comparatively heavy can be disposed on the lower side, and the control unit which is comparatively light can be disposed on the upper side, with the result of providing a good balance for the vehicle weight. Moreover, it is difficult for water, mud or the like coming from the road surface to splash on the control unit.

According to an object of an embodiment of the present invention, the control unit is disposed directly above a support bracket 55 to be bridgingly disposed between left and right frame members 44 and supporting a lower portion of the steering shaft.

According to this configuration, the distance between the control unit and the power assist motor is further shortened. In addition, the control unit is contained more compactly in the vicinity of the steering shaft.

According to an object of an embodiment of the present invention, the all-terrain vehicle includes a front suspension 15 for independently suspending left and right front wheels 2. A vehicle body frame 4 is provided that includes support members 51a for supporting upper end portions of shock absorber units 74 of the front suspension. The control unit is disposed on the upper side of the support members.

According to this configuration, the control unit is disposed at a higher position than the front suspension in the vehicle body frame, and, therefore, would not affect the strokes of the front suspension.

It is an object of an embodiment of the present invention, the steering shaft is supported on a support bracket 54 located at an uppermost portion of the vehicle body frame with the control unit being disposed in the vicinity of the support bracket.

According to this configuration, the control unit is disposed in the vicinity of the uppermost portion of the vehicle body frame, so that the control unit is hardly influenced by water, mud or the like coming from the road surface, and the control unit can be easily covered with a cover or the like from the upper side.

According to an object of an embodiment of the present invention, the power assist motor is disposed on the rear side of the steering shaft, and the control unit is disposed on the front side of the steering shaft.

According to this configuration, the actuator unit can be disposed on the lower side of the vehicle body and in a central area while securing an accommodation space for the passenger(s). In addition, the power assist motor which is comparatively heavy is disposed in the direction of the vehicle center while the control unit which is comparatively light is disposed on the front side of the control unit, whereby they can be contained compactly in the vicinity of the steering shaft, while enhancing the utility of respective spaces. Thus, the weight balance of the vehicle can be improved. Furthermore, the wiring between the power assist motor and the control unit can be disposed along the steering shaft.

According to an embodiment of the present invention, the control unit can be disposed compactly through effective utilization of the space around the steering shaft, the weight balance of the vehicle can be improved, and the control unit can be favorably protected from water, mud or the like coming from the ground surface at the time of operation on rough terrain or the like.

According to an embodiment of the present invention, the length of the wiring between the control unit and the power assist motor can be reduced, to obtain a simplification of the wiring and a reduction in noise, while effectively utilizing the space around the steering shaft.

According to an embodiment of the present invention, the control unit can be favorably protected from water, mud or the like coming from the road surface, while suppressing the influence of the control unit on the strokes of the front suspension.

According to an embodiment of the present invention, the control unit can be favorably protected from water, mud or the like coming from the road surface, and the capability to protect the control unit can be further enhanced by mounting a cover or the like.

According to an embodiment of the present invention, it is possible to improve the weight balance of the vehicle and to easily lay the wiring between the power assist motor and the control unit, while securing an accommodation space for the passenger(s), by enhancing the utility of the space around the steering shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below referring to the drawings. The front (forward), rear (rearward), left, right and the like directions are the same as the direction of the vehicle, unless otherwise specified. In addition, arrow FR in the drawings indicates the vehicle front side, arrow LH indicates the vehicle left side, and arrow UP indicated the vehicle upper side.

Figure 1:
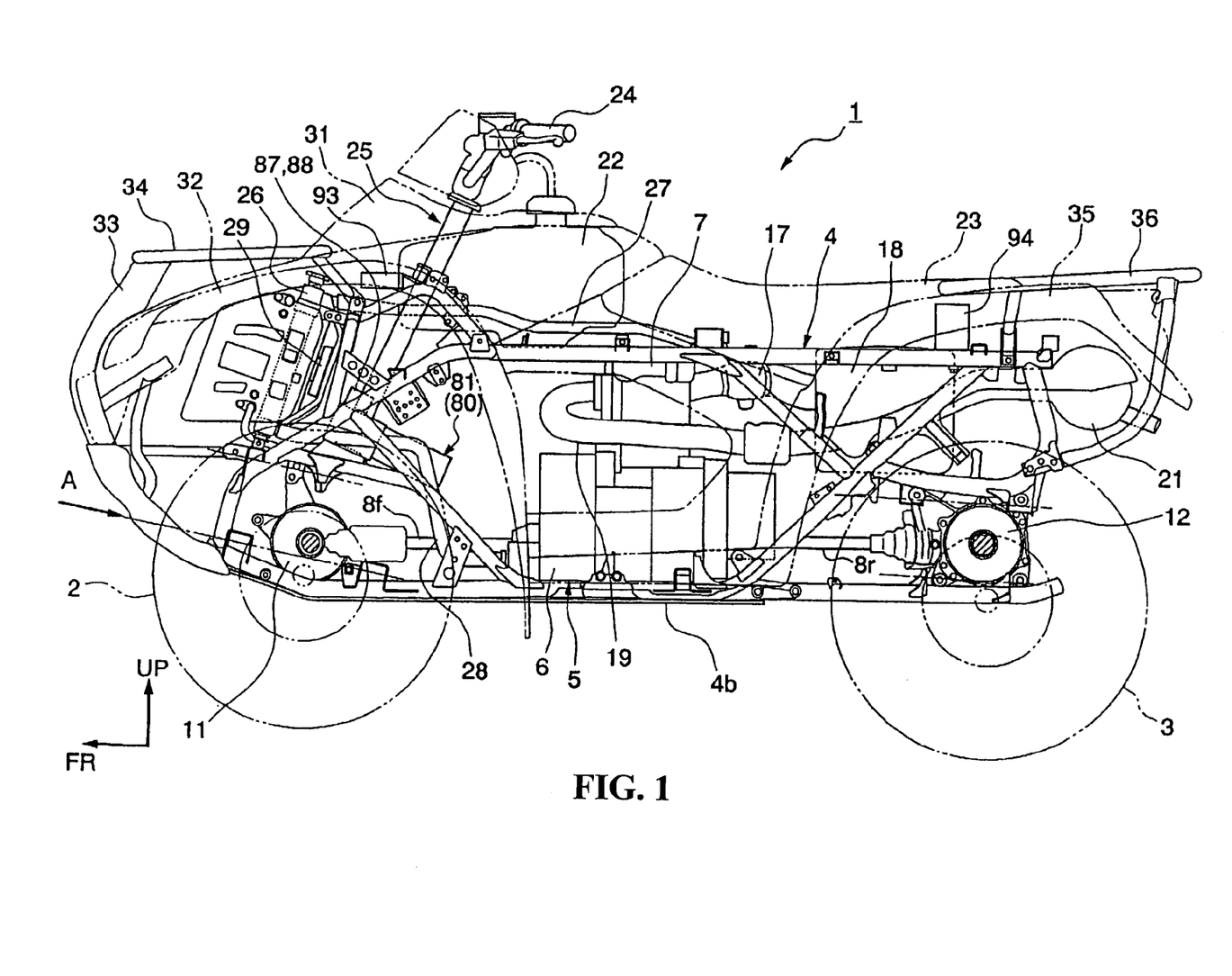
FIG. 1 is a side view of a saddle ride type four-wheel vehicle in an embodiment of the present invention.

A saddle ride type four-wheel vehicle (all-terrain vehicle) 1 shown in FIG. 1 is a so-called ATV (All-Terrain Vehicle) in which left and right front wheels 2 and rear wheels 3 are provided as comparatively large-diameter low-pressure balloon tires at the front and rear portions of the vehicle body. The ground clearance is set to be large so as to enhance principally the capability of operating on rough terrain.

An engine 5, as the prime mover of the saddle ride type four-wheel vehicle 1, is mounted at approximately a central portion of a vehicle body frame 4. The engine 5 is a water-cooled type single-cylinder engine, that is mounted in the so-called longitudinal layout in which the rotational axis of a crankshaft is set along the vehicle front-rear direction. A crankcase 6 constituting a lower portion of the engine 5 functions also as a transmission case, and propeller shafts 8*f* and 8*r* are led out, respectively, forwardly and rearwardly from positions, set off for example to the left side, of front and rear portions of the crankcase 6.

Figure 4:
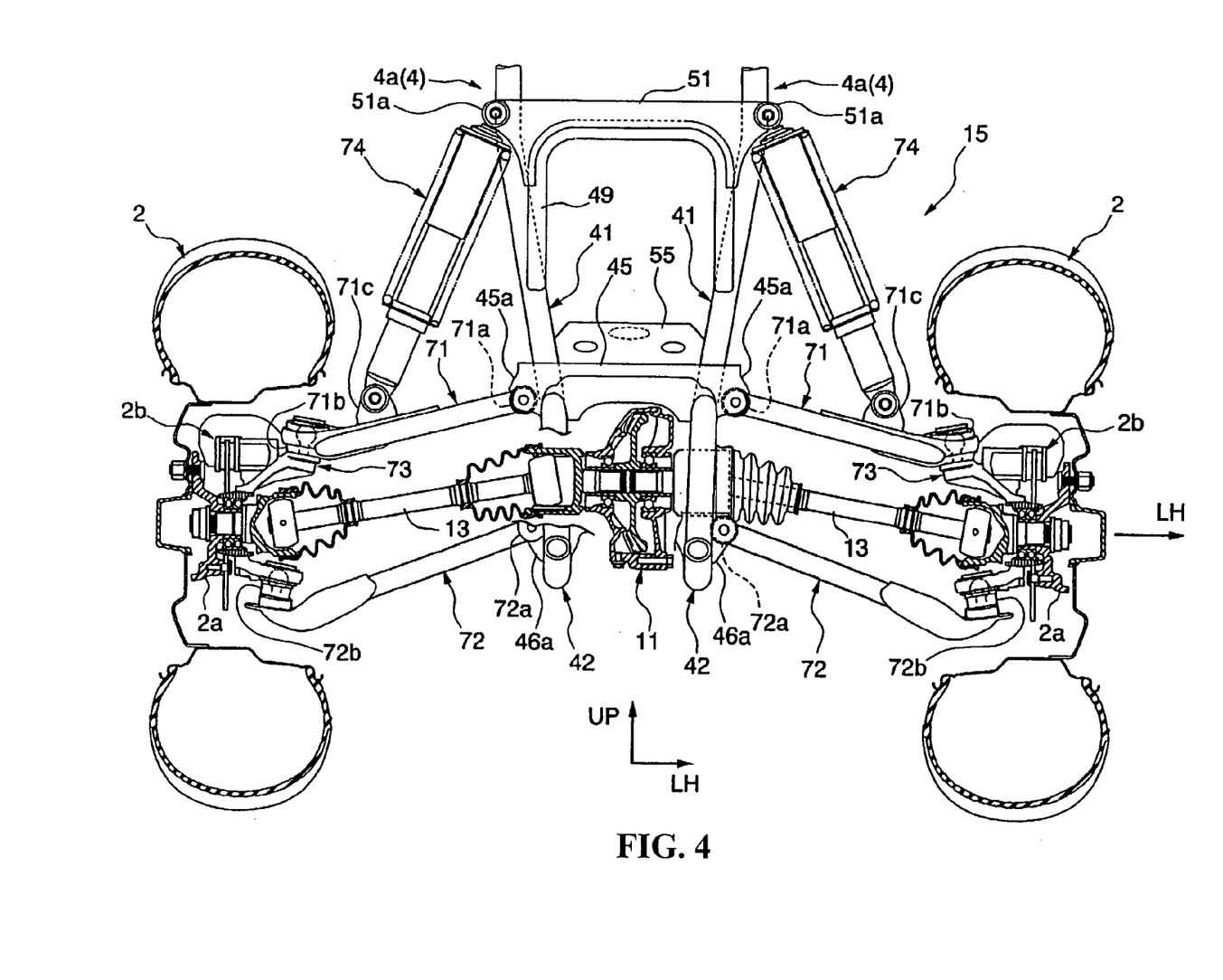
FIG. 4 is a view along arrow A of FIG. 1.

The propeller shafts 8*f* and 8*r* are connected, respectively, to the front wheels 2 and the rear wheels 3 so as to permit the transmission of power, respectively, through a front speed reduction mechanism 11 and a rear speed reduction mechanism 12 and drive shafts (only the front-side ones are indicated and denoted by symbol 13 in FIG. 4) extending in the left-right direction from the speed reduction mechanisms 11 and 12, respectively, on the front lower side and the rear lower side of the vehicle body frame 4. The front wheels 2 and the rear wheels 3 are suspended, respectively, through a front suspension 15 (front wheel suspension system, see FIG. 4) and a rear suspension (not shown) of the independent suspension system (more specifically, double wishbone system), respectively, at front portions and rear portions of the vehicle body frame 4.

In the engine 5, a throttle body 17 is connected to a rear portion of a cylinder portion 7 erected on the crankcase 6, and an air cleaner case 18 is connected to a rear portion of the throttle body 17. On the other hand, a base end portion of an exhaust pipe 19 is connected to a front portion of the cylinder portion 7. The exhaust pipe 19 extends to the front side of the cylinder portion 7, is then bent back to the rear side, and a tip end portion thereof is connected to a muffler 21 disposed at a rear portion of the vehicle body.

A fuel tank 22 and a saddle ride type seat 23 are disposed, in this order from the front side, in a central area in the vehicle width direction of an upper portion of the vehicle body of the saddle ride type four-wheel vehicle 1. In addition, a bar type handle 24 forming left and right grip portions is disposed on the skewly upper front side of the fuel tank 22. The handle 24 is fixed to an upper end portion of a steering shaft 25 extending rectilinearly in the vertical direction. A battery 94 as a vehicle power source is disposed on the lower side of a rear portion of the seat 23.

The steering shaft 25 is provided in the state of being inclined so that its upper portion is located on the rear side. The fuel tank 22 is located directly on the rear side of an upper portion of the steering shaft 25, and the seat 23 is located directly on the rear side of the fuel tank 22. In addition, the engine 5 is located on the rear side of a lower portion of the steering shaft 25, with a predetermined spacing therebetween.

A radiator 26 for cooling the engine 5 is laid out on the front side of a lower portion of the steering shaft 25. The radiator 26 is of the down flow type (vertical flow type), and a front end portion of an inflow-side hose 27, that extends forwardly from the cylinder portion 7 of the engine 5 while being substantially horizontal, is connected to an upper tank of the radiator 26. On the other hand, a front end portion of an outflow-side hose 28 extends rearwardly toward the crankcase 6 on the skewly lower rear side while being in a crank-like shape is connected to a lower tank of the radiator 26.

Like the steering shaft 25, the radiator 26 is provided in the state of being inclined so that its upper portion is located on the rear side. An electrically driven type radiator fan 29 is mounted to the rear surface side of the radiator 26 through a stay or the like.

A resin-made vehicle body cover 31 is provided for covering a front portion of the vehicle body as needed. A resin-made front fender 32 covers the upper to rear side of the front wheels with a front protector 33 and a front carrier 34 which are formed mainly of a stainless steel member being mounted to a front portion of the vehicle body frame 4. In addition, a resin-made rear fender 35 is provided for covering the upper to front side of the rear wheels 3 with a rear carrier 36 formed mainly of a stainless steel member being mounted to a rear portion of the vehicle body frame 4. In addition, a lower protective plate 4b is provided over the range of the lower side of the speed reduction mechanism 11 together an actuator unit 81 (described later) and the engine 5 so as to protect them from water, mud or the like coming from the road surface.

Figure 2:
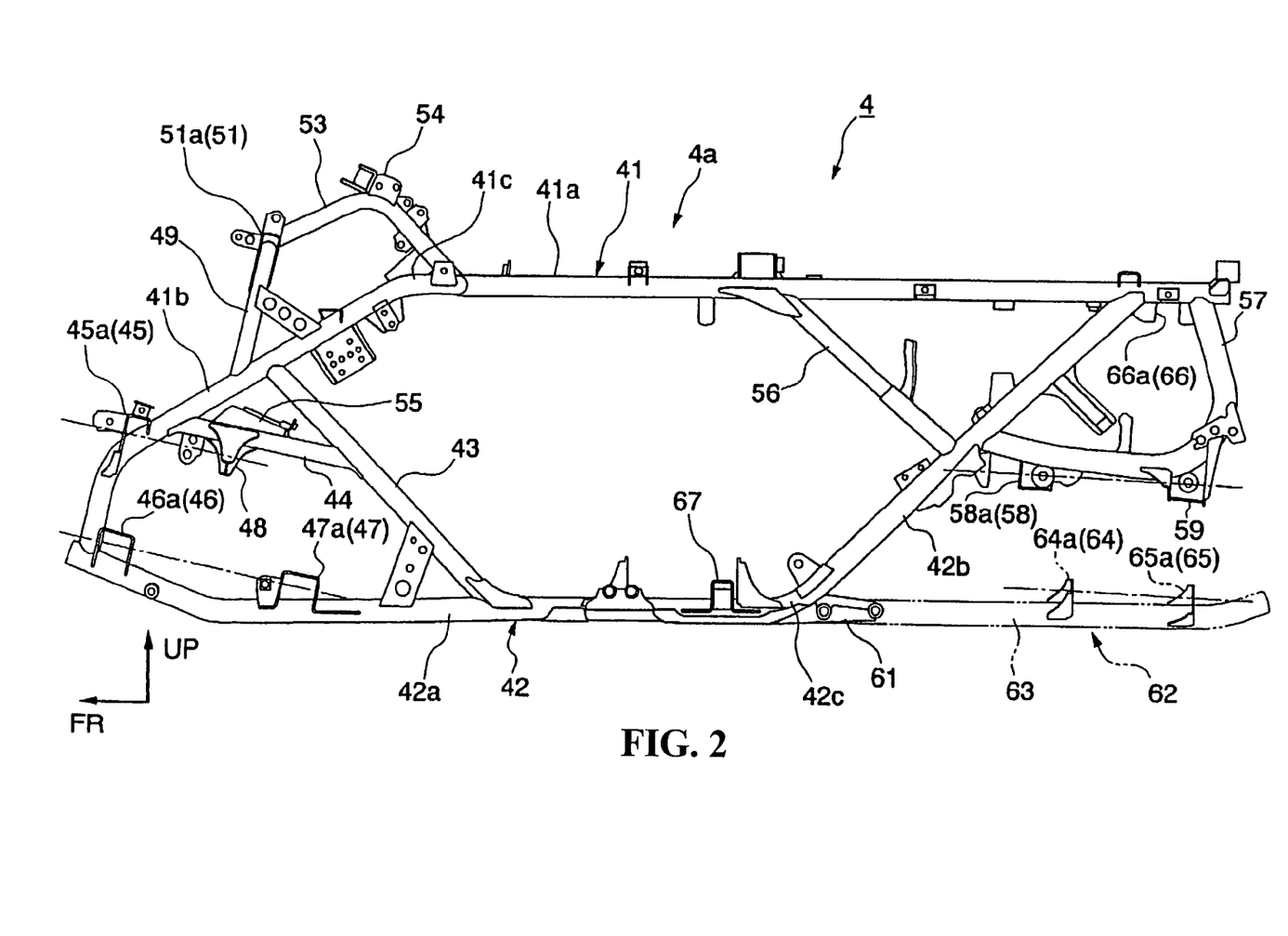
FIG. 2 is a side view of a vehicle body frame of the saddle ride type four-wheel vehicle.
Figure 3:
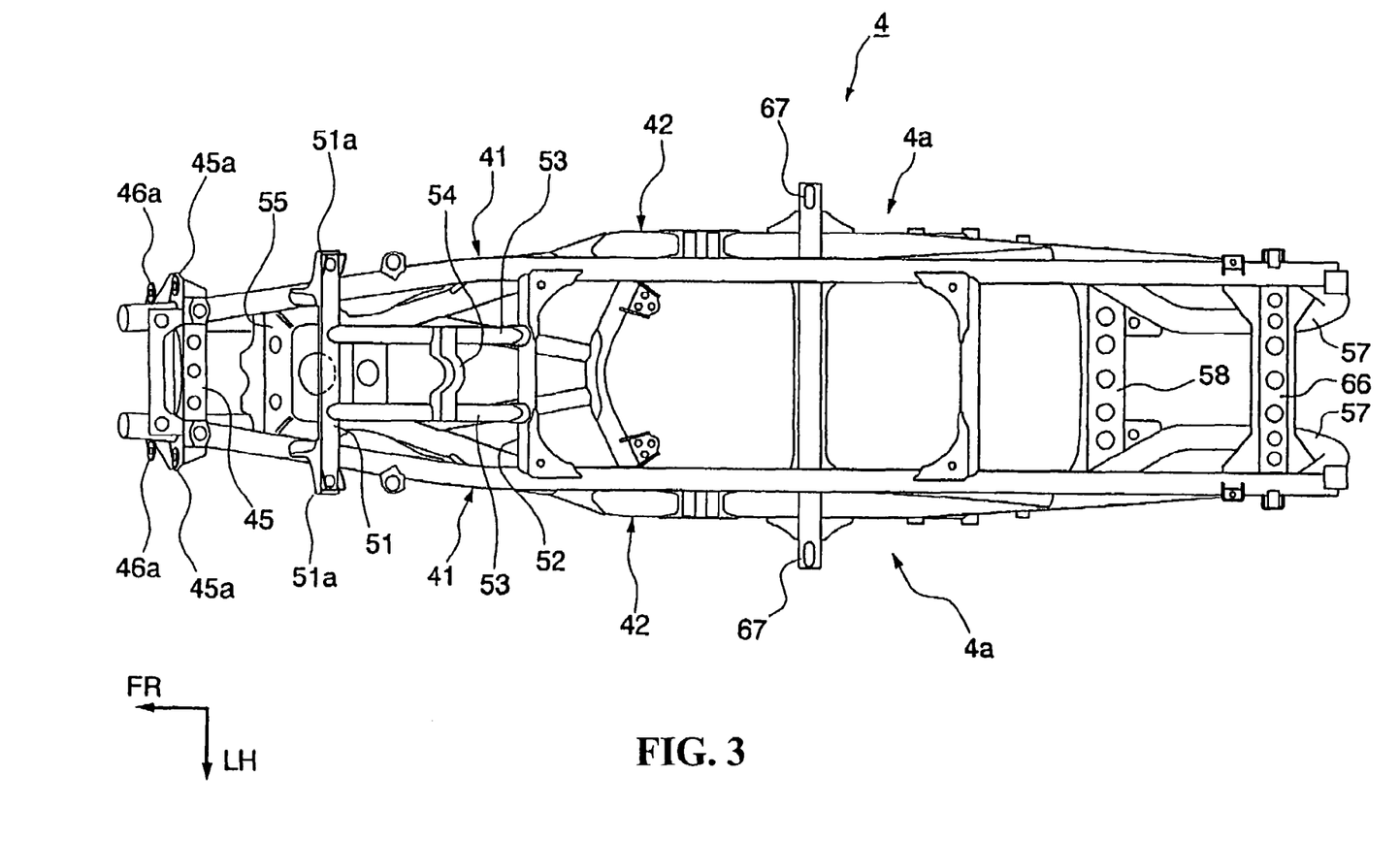
FIG. 3 is a top plan view of the vehicle body frame.

Referring to FIGS. 2 and 3, the vehicle body frame 4 is produced by integrally joining a plurality of kinds of steel members (frame members) by welding or the like. To be more specific, left and right upper pipes 41 and lower pipes 42 are used to form a left-right pair of closed loop structures 4a, which are joined to each other through a plurality of cross members, thereby forming a box structure elongate in the front-rear direction in a central area in the vehicle width direction.

The upper pipe 41 has a structure in which, in a side view of the vehicle body, an upper horizontal portion 41a extends rearwardly from a position slightly on the rear side relative to a roughly central portion in the longitudinal direction of the steering shaft 25 with a front inclined portion 41b extending skewly forwardly and downwardly from the front end of the upper horizontal portion 41a being integrally formed by subjecting a single steel pipe to a bending operation. The bent portion between the upper horizontal portion 41a and the front inclined portion 41b will hereinafter be referred to as front bent portion 41c.

On the other hand, the lower pipe 42 has a structure in which, similarly in a side view of the vehicle body, a lower horizontal portion 42a extends forwardly from a position in the vicinity of the rear end of a bottom portion of the engine 5 and a rear inclined portion 42b extends skewly rearwardly upwardly from the rear end of the lower horizontal portion 42a which are integrally formed by subjecting a single steel pipe to a bending operation. The bent portion between the lower horizontal portion 42a and the rear inclined portion 42b will hereinafter be referred to as rear bent portion 42c.

Front end portions and rear end portions of the left right upper pipes 41 and front end portions and rear end portions of the left and right lower pipes 42 are joined, thereby forming the left-right pair of closed loop structures 4a roughly in the shape of a parallelogram in a side view.

In addition, a gusset pipe 43 that is inclined forwardly and upwardly is bridgingly provided between an intermediate portion of the front inclined portion 41b of the upper pipe 41 and an intermediate portion of the lower horizontal portion 42a of the lower pipe 42. Further, a sub-gusset pipe 44 that is inclined more gently than the gusset pipe 43 is bridgingly provided between an intermediate portion 43 of the gusset pipe 43 and the front inclined portion 41b of the upper pipe 41.

In addition, a middle-stage front side cross member 45 is bridgingly provided between the front inclined portions 41b of the left and right upper pipes 41, and a lower-stage front side cross member 46 and a lower-stage rear side cross member 47 are bridgingly provided between the lower horizontal portions 42a of the left and right lower pipes 42.

Referring to FIG. 4, middle-stage front side support portions 45a for supporting the front side of base end portions of upper arms 71 of the front suspension 15 are provided, respectively, at both end portions of the middle-stage front side cross member 45. In addition, the sub-gusset pipes 44 are provided, respectively, with middle-stage rear side support brackets 48 for supporting the rear side of base end portions of the upper arms 71.

On the other hand, lower-stage front side support portions 46a and lower-stage rear side support portions 47a for supporting the front side and the rear side of base end portions of lower arms 72 of the front suspension 15 are provided, respectively, at both end portions of the lower-stage front side cross member 46 and the lower-stage rear side cross member 47.

A connection pipe 49 in a roughly U-shape opened to the lower side in vehicle front view is provided on the front inclined portions 41b of the left and right upper pipes 41, and both end portions of the connection pipe 49 are joined, respectively, to intermediate portions of the front inclined portions 41b. An upper gusset 51 is provided at an upper side portion of the connection pipe 49, and the upper gusset 51 is provided at both its end portions with frame-side mounts 51a for supporting upper end portions of shock absorbers 74 of the front suspension 15.

Figure 5:
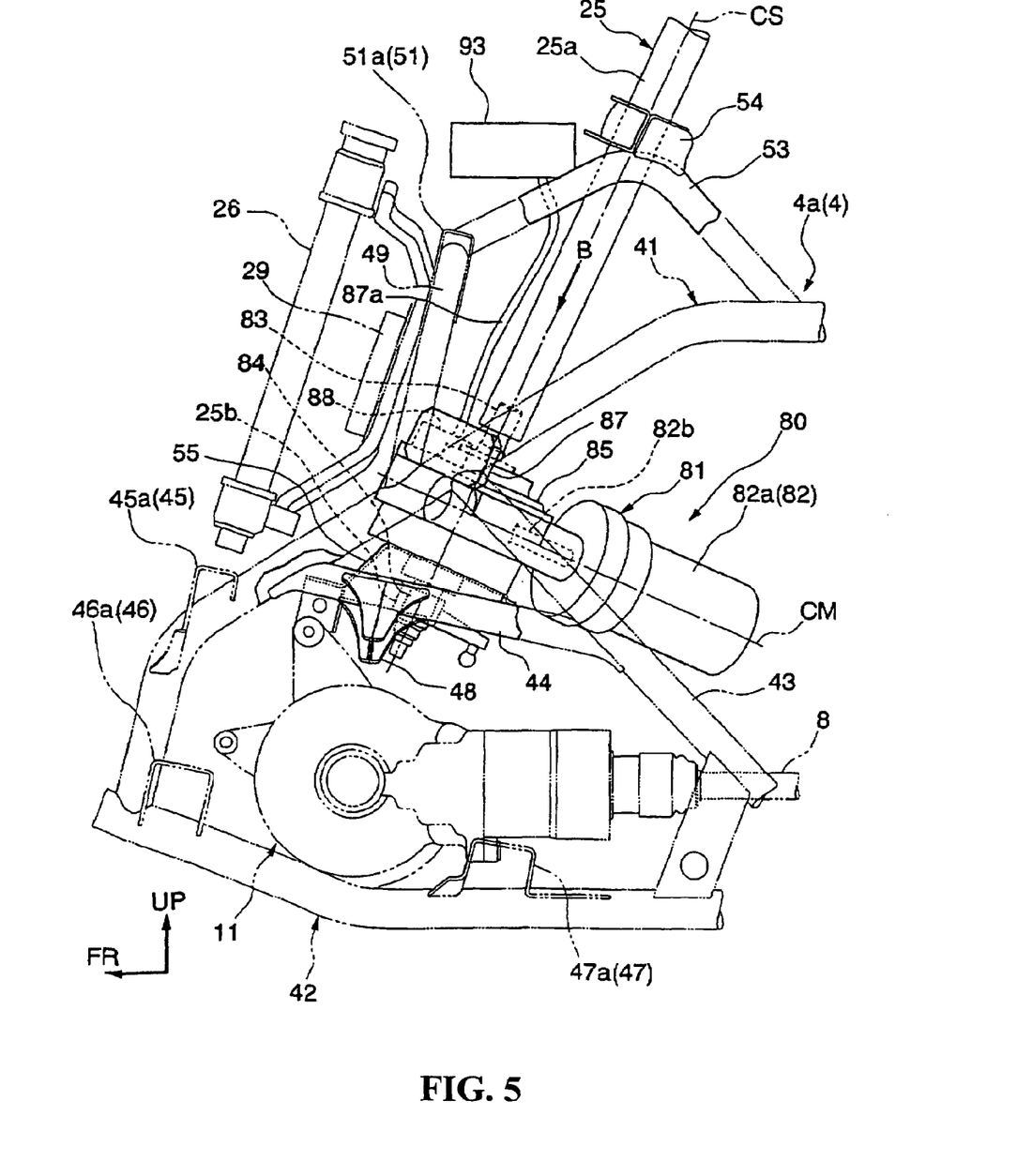
FIG. 5 is a side view showing a front portion of the vehicle body of the saddle ride type four-wheel vehicle.

Referring to FIG. 5, a left-right pair of top pipes 53 in a roughly inverted V-shape in a side view are bridgingly provided between the upper gusset 51 and an upper cross pipe 52 bridgingly provided between the left and right upper pipes 41 in the vicinity of the front bent portions 41c. The top pipes 53 are each so located that the top portions (serving also as an uppermost portion of the vehicle body frame 4) overlap with the steering shaft 25 in a side view, and an upper portion support bracket 54 for supporting an upper portion of the steering shaft 25 is bridgingly provided between the left and right top portions of the top pipes 53. On the other hand, a lower portion support bracket 55 for supporting a portion near a lower end portion of the steering shaft 25 is bridgingly provided between the sub-gusset pipes 44.

As shown in FIGS. 2 and 3, rear gusset pipes 56 inclined forwardly and upwardly are bridgingly provided, respectively, between intermediate portions of the upper horizontal portions 41a of the upper pipes 41 and intermediate portions of the rear inclined portions 42b of the lower pipes 42. In addition, a rear sub-pipe 57, that is bent so as to project toward the skewly rear lower side in a side view, is provided on the lower side of rear portions of the upper pipe 41 and the lower pipe 42, and both ends of the rear sub pipe 57 are joined, respectively, to a rear end portion of the upper pipe 41 and to an intermediate portion of the rear inclined portion 42b.

A middle-stage front side cross member 58 is bridgingly provided between lower portions of the left and right rear sub-pipes 57. The middle-stage front side cross member 58 is provided at both its end portions with middle-stage front side support portions 58a for supporting the front side of base end portions of upper arms of the rear suspension. In addition, middle-stage rear side support portions 59 for supporting the rear side of the base end portions of the upper arms of the rear suspension are provided on the rear side of the middle-stage front side cross member 58 of the rear sub pipes 57.

Rear connection brackets 61 that project towards the rear side are provided at the rear bent portions 42c of the lower pipes 42. The rear connection brackets 61 are for supporting a front end portion of a rear sub frame assembly 62.

The rear sub-frame assembly 62 has a structure in which a left-right pair of lower sub-pipes 63 that extend in the front-rear direction and a lower-stage front side cross member 64 and a lower-stage rear side cross member 65 which are bridgingly provided between the lower sub-pipes 63 are integrally joined by welding or the like. The lower-stage front side cross member 64 and the lower-stage rear side cross member 65 are provided at both their end portions with lower-stage front side support portions 64a and lower-stage rear side support portions 65a for supporting the front side and the rear side of the base end portions of the lower arms of the rear suspension, respectively.

A rear upper cross member 66 that is bridgingly provided between rear end portions of the left and right upper pipes 41 is provided at both its end portions with frame-side mounts 66a for supporting upper end portions of shock absorber units (shock absorbers) of the rear suspension, respectively. A step bar 67 constitutes a passenger step portion, together with a step board extending over the range of the front fender 32 and the rear fender 35.

As shown in FIG. 4, the front suspension 15 includes left and right upper arms 71 and lower arms 72 swingably supported on their base end side on the vehicle body frame 4, left and right knuckles 73 supported on tip end portions of the upper arms 71 and lower arms 72, and left and right shock absorbers 74 each of which is interposed between the lower arm 72 and the vehicle body frame 4.

Figure 6:
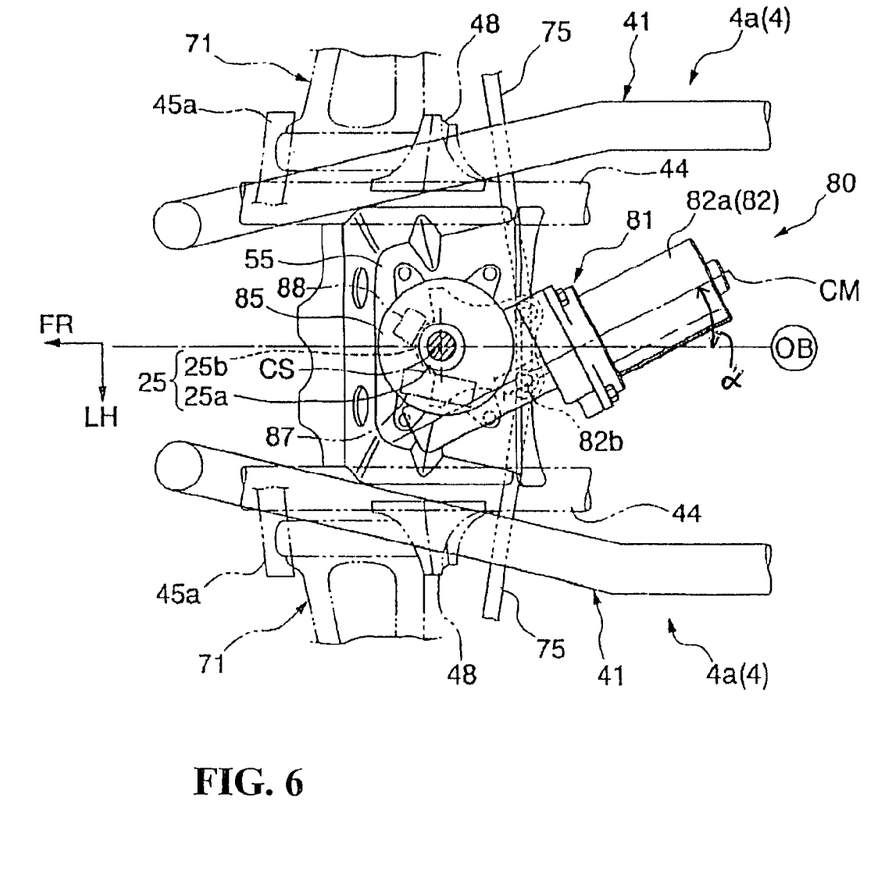
FIG. 6 is a view along arrow B of FIG. 5.

Referring to FIG. 6, each of the upper arms 71 is branched from the tip end side toward the base end side in top plan view. On the base end side, a pivot pipe portion 71a along a swing shaft is bridgingly provided between both branch ends. Also, each of the lower arms 72 is branched from the tip end side toward the base end side in top plan view (omitted in the figures), and pivot pipe portions 72a along a swing shaft are bridgingly provided at both branch ends, respectively. OB in FIG. 6 denotes a center line in the vehicle width direction, and a power assist motor 82 which is comparatively heavy is disposed in proximity to the center line OB, whereby a good weight balance between the left and right sides of the vehicle is achieved. In addition, FIG. 6 shows that the power assist motor 82 extends in a direction rearwardly from the steering shaft 25 in a direction such that a center line CM of the power assist motor 82 and a center line OB of the of the all-terrain vehicle intersect at an acute angle α, and such that it does not overlap left and right sub-gusset pipes 44. Further, FIG. 6 shows that power assist motor 82 is disposed entirely rearwardly of a pair of left and right tie rods 75 when the all-terrain vehicle is viewed in plan view.

A front portion and a rear portion of the pivot pipe portion 71a of the upper arm 71 are shaft-supported, respectively, on the middle-stage front side support portion 45a and the middle-stage rear side support bracket 48 of the vehicle body frame 4 through the swing shaft. In addition, the front and rear pivot pipe portions 72a of the lower arm 72 are each shaft-supported, respectively, on the lower-stage front side support portion 46a and the lower-stage rear side support portion 47a through the swing shaft. Here, the middle-stage front side support portion 45a and the middle-stage rear side support bracket 48, and the lower-stage front side support portion 46a and the lower-stage rear side support portion 47a serve also as parts of the front suspension 15.

An upper portion or a lower portion of the knuckles 73 is connected to one of tip end portions of the upper arm 71 and the lower arm 72 through ball joints 71b and 73b, respectively. A hub portion 2a of the front wheel 2 is rotatably supported on the outer side of the knuckle 73. In addition, a disk brake 2b as a front wheel brake is configured on the inner side of the front wheel 2.

The upper arm 71 is provided, at its portion on the upper surface side and near its tip end, with an arm-side mount 71c projecting upwards. A lower end portion of the shock absorber unit 74 is connected to the arm-side mount 71c, through a connection shaft which is parallel to the swing shaft. On the other hand, an upper end portion of each shock absorber unit 74 is connected to the frame-side mount 51a of the vehicle body frame 4, through a connection shaft which is similarly parallel to the swing shaft.

This ensures that when an impact load is inputted from the road surface to the front wheel 2, the front wheels 2 are vertically swung through the upper arms 71 and the lower arms 72 individually on the left and right sides, and the left and right shock absorber units 74 are expanded or contracted, whereby the load is gently absorbed by the shock-absorbing actions of the shock absorber units 74. In addition, the rear suspension has the same configuration as that of the front suspension 15. Therefore, description thereof is omitted.

As shown in FIGS. 4 and 5, in a roughly central area in the vehicle width direction of the vehicle body frame 4, the front speed reduction mechanism 11 is disposed between the lower-stage front side cross member 46 and the lower-stage rear side cross member 47. The front speed reduction mechanism 11 is a mechanism for reducing the speed of the rotational motion of the propeller shaft 8f extending forwards from the crankcase 6 of the engine 5 and for converting the rotation into rotations of left and right front drive shafts 13.

Left and right output portions on the outside of the front speed reduction mechanism 11 are connected to the hub portions 2a of the left and right front wheels 2 through the left and right drive shafts 13, each of which has universal joints at both ends thereof, respectively. The drive force from the engine 5 is transmitted through the propeller shaft 8f, the front speed reduction mechanism 11 and the left and right drive shafts 13 to the left and right front wheels 2, respectively.

A lower end portion of the steering shaft 25 is located in the vicinity of the front speed reduction mechanism 11, and the lower end portion is connected to the left and right knuckles 73 through a left-right pair of tie rods 75 (see FIG. 6), respectively. This ensures that attendant on a rotation of the steering shaft 25, the knuckles 73 and the front wheels 2 are steered to the same direction through the tie rods 75.

As shown in FIG. 5, the saddle ride type four-wheel vehicle 1 includes an electrically driven power steering system 80 for alleviating the handle operating force, i.e., the front wheel steering force.

The power steering system 80 includes an actuator unit 81 integral with a power assist motor 82 provided at an intermediate portion of the steering shaft 25, and a control unit 93 as an ECU (Electric Control Unit) for drive control of the power assist motor 82 based on a detected value detected by a torque sensor 91 (see FIG. 8) in the actuator unit 81. More specifically, in the power steering system 80, electric power of the battery 94 is supplied to the control unit 93, and the electric power is supplied from the control unit 93 to the actuator unit 81.

The steering shaft 25 is divided into at the actuator unit 81 an upper shaft 25a and a lower shaft 25b, a lower end portion of the upper shaft 25a is coaxially connected to an input shaft 83 of the actuator unit 81, and an upper end portion of the lower shaft 25b is coaxially connected to an output shaft 84 of the actuator unit 81. The shafts 83 and 84 are connected to each other through a torsion bar 92 (see FIG. 8), which is a part of the torque sensor 91, in a housing 85.

Since a grounding resistance acts on the front wheels 2, when the handle 24 is operated clockwise or counterclockwise, a relative rotational force is generated between the input shaft 83 that is mechanically connected to the handle 24 and the output shaft 84 that is mechanically connected to the front wheels 2.

In this instance, a torsion is generated in the torsion bar 92 interposed between the shafts 83 and 84, a rotational torque exerted on the steering shaft 25, i.e., a steering torque of the handle 24, is detected based on the torsion, and a signal according to the detected value is inputted to the control unit 93, whereby the drive control of the power assist motor 82 is performed based on the signal.

Figure 7:
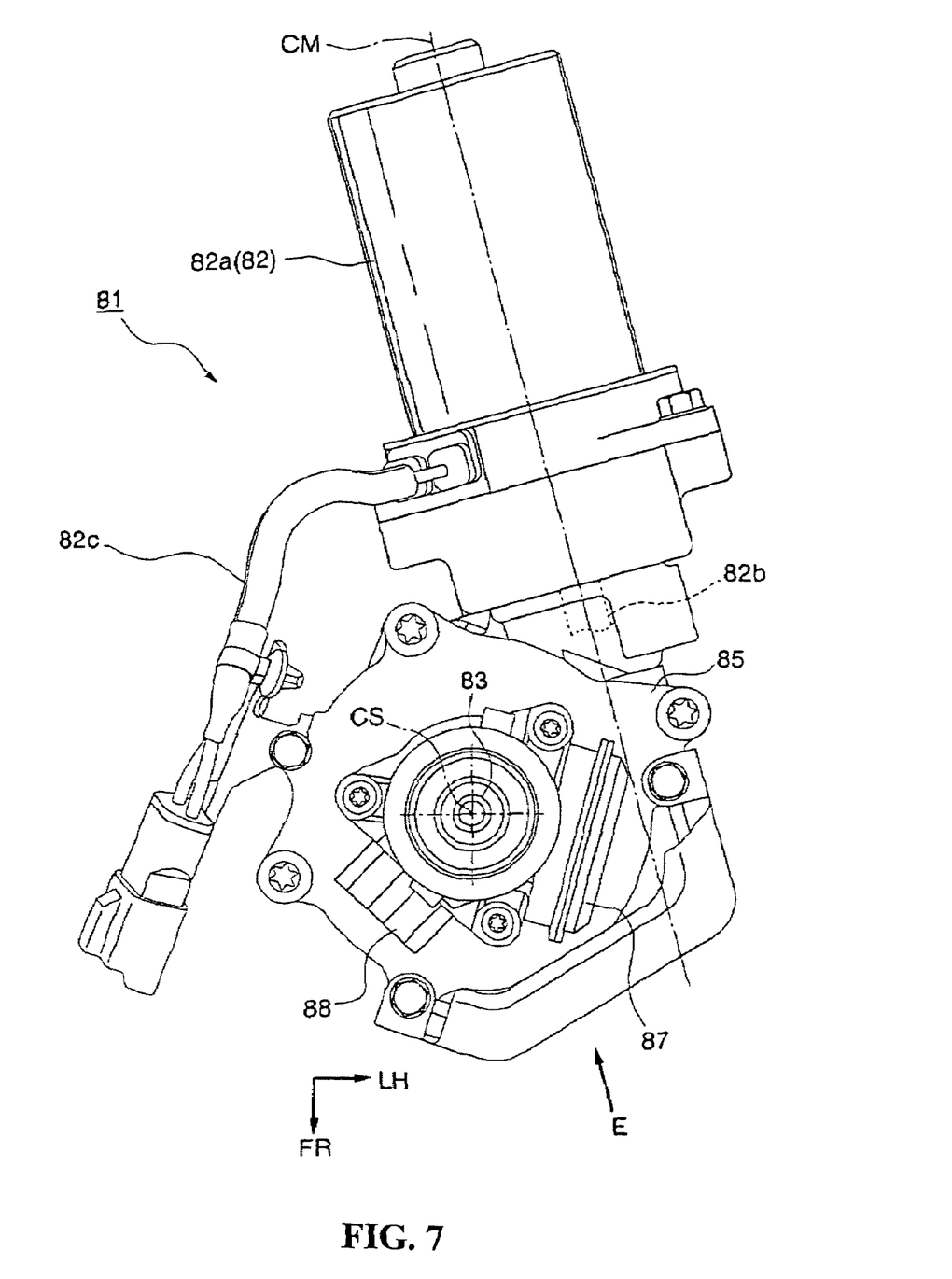
FIG. 7 is a top plan view of an actuator unit, as viewed in the drawing direction of FIG. 6.
Figure 8:
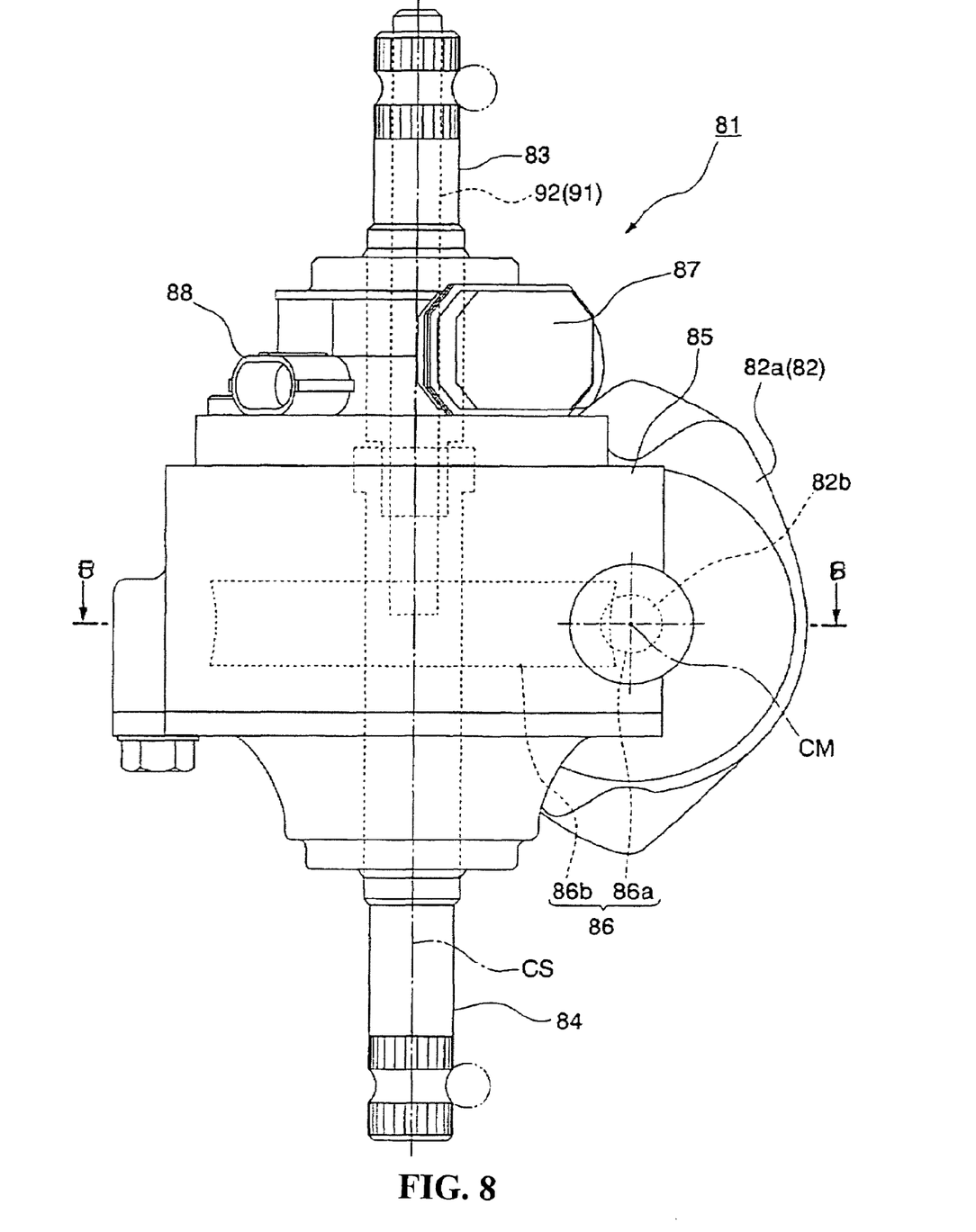
FIG. 8 is a view along arrow E of FIG. 7.
Figure 9:
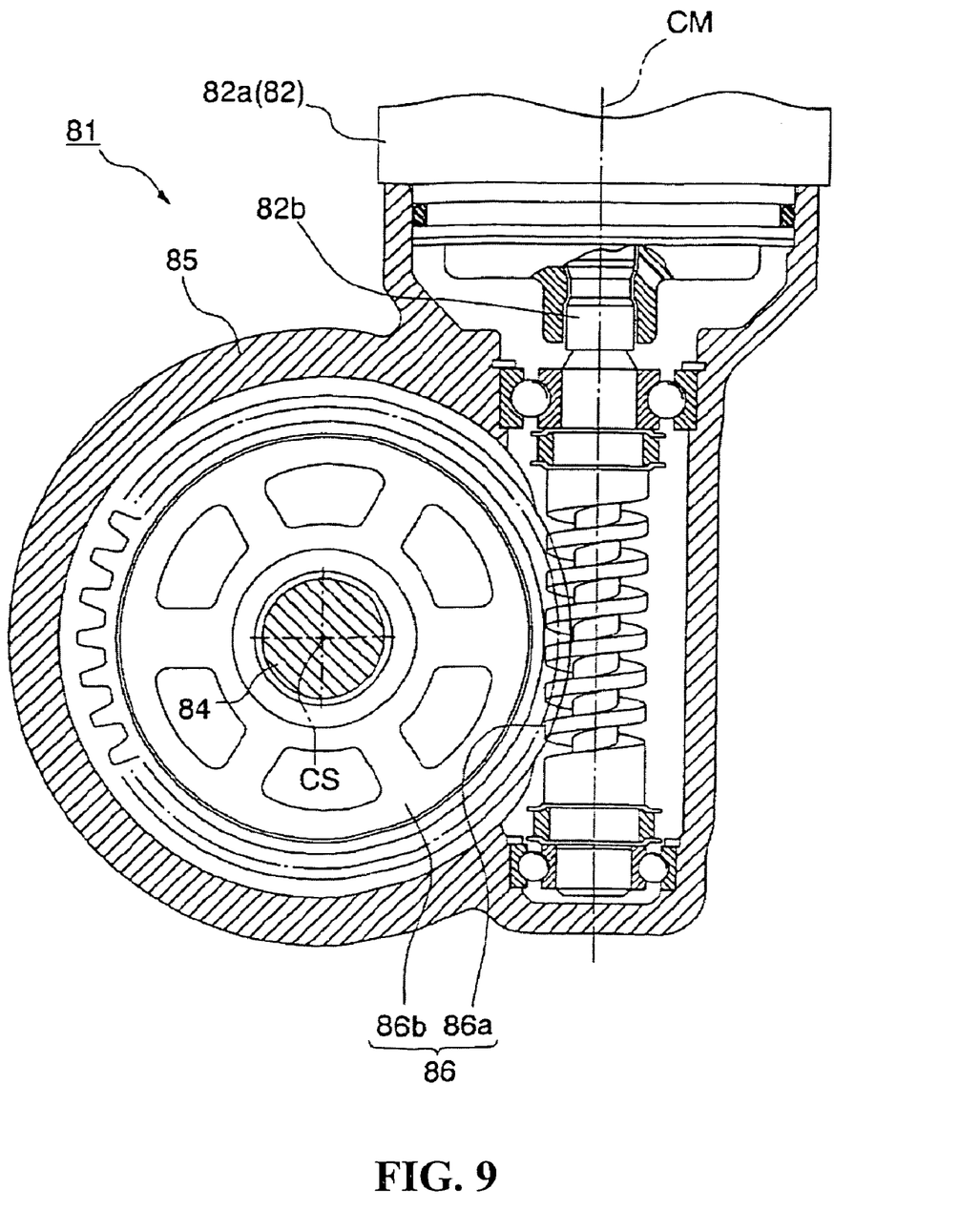
FIG. 9 is a sectional view along line 8-8 of FIG. 8.

As shown in FIGS. 7, 8 and 9, the power assist motor 82 has a configuration in which a rotary shaft 82*b* is projected from one end side of a cylindrical motor body 82*a* coaxially with the motor body 82*a*, and the power assist motor 82 is so disposed so that its axis CM is perpendicular to the axis CS of the steering shaft 25. In this condition, the motor body 82*a* is fixed to the housing 85, the rotary shaft 82*b* enters the housing 85, and the rotary shaft 82*b* and the output shaft 84 are interlinked to each other through a worm-gear pair (meshed portion) 86 contained in the housing 85.

More specifically, a worm gear 86*a*, coaxial with the rotary shaft 82*b* of the power assist motor 82, is mounted to a tip end portion of the rotary shaft 82*b*, while a worm wheel gear 86*b*, coaxial with the output shaft 84, is mounted to an upper end portion of the output shaft 84, and the gears 86*a* and 86*b* are meshed with each other, whereby the drive force of the power assist motor 82 is transmitted to the output shaft 84 through speed reduction.

This ensures that when the handle 24 is turningly operated, a rotating operational force from the handle 24 is inputted to the steering shaft 25 (output shaft 84). Simultaneously, an auxiliary rotating force from the power assist motor 82 is given to the steering shaft 25 (output shaft 84), whereby a handle operating force is alleviated. An amplifier circuit portion 87 in FIG. 7 processes an electrical signal from the torque sensor 91, and includes a failure diagnosis circuit. In addition, a coupler 88 is a part to be mated to an amplifier harness 87*a* (see FIG. 5) for a connection between the amplifier circuit portion 87 and the control unit 93. The amplifier circuit portion 87 and the coupler 88 are provided on an outside wall of the housing 85. In addition, as illustrated in FIG. 7 a power supply harness 82*c* is provided for the power assist motor 82.

As shown in FIG. 5, the amplifier harness 87*a* is laid directly on the front side of and along the steering shaft 25 without being bundled with other wiring, whereby a reduction in noise is contrived. The amplifier harness 87*a* is fixed to the top pipe 53 by a band, in the vicinity of the control unit 93.

As shown in FIGS. 5 and 6, the actuator unit 81 is located in the vicinity of a lower end portion of the steering shaft 25, and its housing 85 (worm-gear pair 86) is fastened by a bolt or the like onto the lower portion support bracket 55 serving as one of the cross members for coupling the closed loop structures 4*a* of the vehicle body frame 4, whereby the actuator unit 81 is firmly fixed to the vehicle body frame 4. The housing 85 of the actuator unit 81 is provided so as to be contained inside the outer shape of the lower portion support bracket 55 in a top plan view.

In this instance, the rotary shaft 82*b* of the power assist motor 82 is provided so as to be adjacent to the skew rear left side of the steering shaft 25, and the motor body 82*a* is provided so as to extend from the rotary shaft 82*b* toward the skew rear right side (in other words, toward the side of the center in the vehicle front-rear direction). In this case, the power assist motor 82 is located on the rear side of the steering shaft 25, and is disposed on the inside of the vehicle body frame 4 so as to be surrounded by the frame members constituting the vehicle body frame 4. The amplifier circuit portion 87 and the coupler 88 of the actuator unit 81 are disposed so as to overlap with the frame members (upper pipe 41 and the like) of the vehicle body frame 4 in side view.

In addition, the power assist motor 82 is disposed so as to be located on the rear side relative to the front suspension 15 (the upper arms 71 and the lower arms 72 as well as the shock absorber units 74) and to be located on the upper side relative to the middle-stage front side support portions 45*a* for supporting the upper arms 71 and the middle-stage rear side support brackets 48. In addition, the power assist motor 82 is located on the downstream side with respect to the airflow generated by the radiator fan 29 on the front side of the steering shaft 25. Thus, the cooling of the power assist motor is enhanced.

The control unit 93 is disposed on the upper side relative to the frame-side mounts 51*a* in a roughly central area in the vehicle width direction, and is disposed on the front side of the upper portion support bracket 54 (on the front side of the steering shaft 25) and close to the upper portion support bracket 54, and is fixed, for example, to the top pipes 53 of the vehicle body frame 4 through stays or the like. In this case, the control unit 93 is located directly above (on the upper side in the vertical direction of) the worm-gear pair 86 (housing 85), and is provided so as to be contained inside the outer shape of the housing 85 containing the worm-gear pair 86 in top plan view.

As has been described above, the power steering system 80 of the saddle ride type four-wheel vehicle 1 in the above embodiment has a structure in which the rotary shaft 82*b* of the power assist motor 82 is disposed at right angles to the steering shaft 25 that is so inclined so that its upper portion is located on the rear side. In addition, the control unit 93 for controlling the power assist motor 82 is disposed on the upper side relative to the worm-gear pair 86 serving as a meshed portion between the power assist motor 82 and the steering shaft 25.

According to this configuration, the control unit 93 is located on the upper side of the actuator unit 81, whereby the wiring (amplifier harness 87*a*) for the connection between the actuator unit 81 and the control unit 93 can be made shorter, and water, mud or the like coming from the road surface is prevented from easily splashing on the control unit 93. Thus, it is possible to reduce the length of the wiring between the control unit 93 and the power assist motor 92, to thereby contrive simplification of the wiring and to provide a reduction in noise. In addition, the control unit 93 is protected from water, mud or the like coming from the ground surface at the time of operation of the vehicle on rough terrain or the like.

In the power steering system 80 as described above, the control unit 93 is disposed directly above the lower portion support bracket 55, whereby the control unit 93 can be protected more favorably from water, mud or the like coming from the road surface.

Furthermore, in the power steering system 80 as described above, the power assist motor 82 is disposed on the rear side of the steering shaft 25, and the control unit 93 is disposed on the front side of the steering shaft 25, whereby the wiring between the power assist motor 82 and the control unit 93 can be laid along the steering shaft 25. In other words, the wiring between the power assist motor 82 and the control unit 93 can be easily laid.

The present invention is not limited to the above-described embodiment, and various modifications, for example modifications as to the detailed structure of the vehicle body frame, can naturally be made without departure from the gist of the invention.

Figure 10:
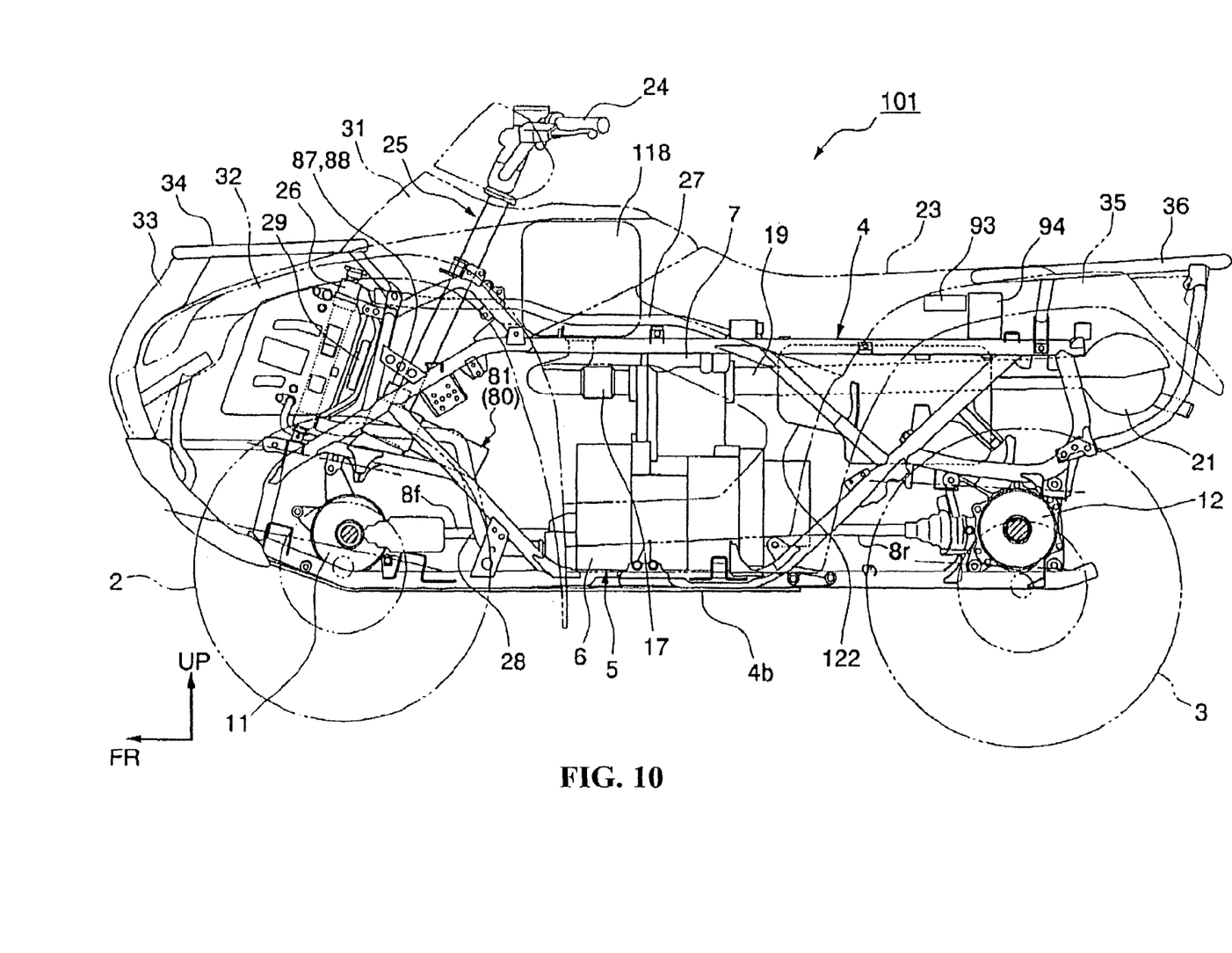
FIG. 10 is a side view, corresponding to FIG. 1, of a modified example of the saddle ride type four-wheel vehicle.

As in a saddle ride type four-wheel vehicle 101 shown in FIG. 10, when a configuration is adopted in which the actuator unit 81 is disposed at a front portion of the vehicle body whereas the control unit 93 is disposed at a rear portion of the vehicle body (for example, in the vicinity of the battery 94 under the seat 23), optimization of the weight balance of the vehicle can be achieved.

On the other hand, in the case where the control unit 93 is disposed at a front portion of the vehicle body as in the above-described embodiment, a configuration may be adopted in which an air cleaner case 118 is disposed at the position (on the front side of the seat 23) where the fuel tank 22 has been located whereas a fuel tank 122 is disposed at the position (on the lower side of the seat 23) where the air cleaner case 18 has been located, whereby the load exerted on the front wheels 2 can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power steering system for an all-terrain vehicle comprising:
   an actuator unit comprising:
      a power assist motor and a torque sensor, said actuator unit being disposed on a steering shaft that is inclined wherein an upper portion thereof is located on a rear side; and
   a control unit for controlling said power assist motor, said control unit being disposed on an upper side of said actuator unit,
   wherein the power assist motor extends in a direction rearwardly from the steering shaft in a direction so that it does not overlap left and right frame members when the all-terrain vehicle is viewed in plan view,
   wherein said power assist motor is disposed entirely rearwardly of a pair of left and right tie rods when the all-terrain vehicle is viewed in plan view.

2. The power steering system for an all-terrain vehicle as set forth in claim 1, wherein said control unit is disposed directly above a lower support bracket bridgingly disposed between the left and right frame members and supporting a lower portion of said steering shaft.

3. The power steering system for an all-terrain vehicle as set forth in claim 1, wherein said all-terrain vehicle comprises a front suspension for independently suspending the left and right front wheels, a vehicle body frame including support members mounted atop a U-shaped connection pipe for supporting upper end portions of shock absorber units of said front suspension, and said control unit is disposed on the upper side of said support members.

4. The power steering system for an all-terrain vehicle as set forth in claim 2, wherein said all-terrain vehicle comprises a front suspension for independently suspending left and right front wheels, a vehicle body frame including support members mounted atop a U-shaped connection pipe for supporting upper end portions of shock absorber units of said front suspension, and said control unit is disposed on the upper side of said support members.

5. The power steering system for an all-terrain vehicle as set forth in claim 1, wherein said steering shaft is supported on an upper support bracket located at an uppermost portion of said vehicle body frame, and said control unit is disposed in the vicinity of said upper support bracket.

6. The power steering system for an all-terrain vehicle as set forth in claim 2, wherein said steering shaft is supported on an upper support bracket located at an uppermost portion of said vehicle body frame, and said control unit is disposed in the vicinity of said upper support bracket.

7. The power steering system for an all-terrain vehicle as set forth in claim 3, wherein said steering shaft is supported on an upper support bracket located at an uppermost portion of said vehicle body frame, and said control unit is disposed in the vicinity of said upper support bracket.

8. The power steering system for an all-terrain vehicle as set forth in claim 4, wherein said steering shaft is supported on an upper support bracket located at an uppermost portion of said vehicle body frame, and said control unit is disposed in the vicinity of said upper support bracket.

9. The power steering system for an all-terrain vehicle as set forth in claim 1, wherein said power assist motor is disposed on the rear side of said steering shaft, and said control unit is disposed on the front side of said steering shaft.

10. The power steering system for an all-terrain vehicle as set forth in claim 2, wherein said power assist motor is disposed on the rear side of said steering shaft, and said control unit is disposed on the front side of said steering shaft.

11. A power steering system for use with an all-terrain vehicle comprising:
    an actuator unit including a power assist motor and a torque sensor, said actuator unit being adapted to be disposed on a steering shaft wherein the actuator unit is located on a rear side of the steering shaft; and
    a control unit for controlling said power assist motor, said control unit being disposed on above said actuator unit,
    wherein the power assist motor extends in a direction rearwardly from the steering shaft in a direction such that a center line of the power assist motor and a longitudinal center line of the of the all-terrain vehicle intersect at an acute angle α.

12. The power steering system for an all-terrain vehicle as set forth in claim 11, wherein said power assist motor is disposed entirely rearwardly of a pair of left and right tie rods when the all-terrain vehicle is viewed in plan view.

13. The power steering system for use with an all-terrain vehicle as set forth in claim 11, wherein said control unit is disposed directly above a support bracket bridgingly disposed between left and right frame members and supporting a lower portion of said steering shaft.

14. The power steering system for use with an all-terrain vehicle as set forth in claim 11, wherein said all-terrain vehicle comprises a front suspension for independently suspending left and right front wheels, a vehicle body frame including support members mounted atop a U-shaped connection pipe for supporting upper end portions of shock absorber units of said front suspension, and said control unit is disposed on the upper side of said support members.

15. The power steering system for use with an all-terrain vehicle as set forth in claim 11, wherein the steering shaft is supported on an upper support bracket located at an uppermost portion of said vehicle body frame, and said control unit is disposed in the vicinity of said upper support bracket.

16. The power steering system for use with an all-terrain vehicle as set forth in claim 13, wherein the steering shaft is supported on an upper support bracket located at an uppermost portion of said vehicle body frame, and said control unit is disposed in the vicinity of said upper support bracket.

17. A power steering system for use with an all-terrain vehicle, comprising:
    an actuator unit including a power assist motor and a torque sensor, said actuator unit being adapted to be disposed on a steering shaft wherein the actuator unit is located on a rear side of the steering shaft; and
    a control unit for controlling said power assist motor, said control unit being disposed on above said actuator unit,
    wherein said all-terrain vehicle comprises a front suspension for independently suspending left and right front wheels, a vehicle body frame including support members mounted atop a single U-shaped connection pipe for supporting upper end portions of shock absorber units of said front suspension, and said control unit is disposed on the upper side of said support members, wherein said power assist motor is disposed entirely rearwardly of a pair of left and right tie rods when the all-terrain vehicle is viewed in plan view.

18. The power steering system for use with an all-terrain vehicle as set forth in claim 17, wherein the steering shaft is supported on an upper support bracket located at an uppermost portion of said vehicle body frame, and said control unit is disposed in the vicinity of said upper support bracket.

* * * * *